United States Patent
Warnacut

[19]

[11] Patent Number: 6,055,771
[45] Date of Patent: May 2, 2000

[54] GERMINATION OF LIVESTOCK FEED GRAINS USING EFFLUENT FROM LIVESTOCK WASTE DIGESTION

[75] Inventor: Dorothy O'Haver Warnacut, Wichita, Kans.

[73] Assignee: Dorian Industries, Inc., Wichita, Kans.

[21] Appl. No.: 09/100,673

[22] Filed: Jun. 19, 1998

[51] Int. Cl.$^7$ .............................. A01B 79/00; A01C 1/00; A01G 31/00; A01G 31/02

[52] U.S. Cl. .................................. 47/58.1; 47/59; 47/61; 47/62 N; 47/65

[58] Field of Search .................................. 47/58, 59, 60, 47/61, 62 R, 62 N, 1.01, 1.5, 1.7, 1.3, 57.6, 64, 65; 71/1, 15, 21; 111/121, 124

[56] References Cited

U.S. PATENT DOCUMENTS

| | | | |
|---|---|---|---|
| 2,012,180 | 8/1935 | Beck | 47/61 |
| 2,051,094 | 8/1936 | Loughridge | 47/61 |
| 2,169,701 | 8/1939 | Lund | 47/61 |
| 2,358,000 | 9/1944 | Cornell | 47/65 |
| 2,360,460 | 10/1944 | Williams | 118/418 |
| 2,622,981 | 12/1952 | Bond et al. | 426/473 |
| 3,276,163 | 10/1966 | Oepen et al. | 47/65 |
| 3,284,948 | 11/1966 | Kyle | 47/65 |
| 3,425,158 | 2/1969 | Kyle | 47/65 |
| 3,616,560 | 11/1971 | Mun | 47/61 |
| 3,768,201 | 10/1973 | Yoo | 47/61 |
| 3,968,254 | 7/1976 | Rhodes et al. | 426/18 |
| 3,982,499 | 9/1976 | Frankl | 119/16 |
| 3,991,514 | 11/1976 | Finck | 47/1.2 |
| 4,028,847 | 6/1977 | Davis et al. | 47/65 |
| 4,064,636 | 12/1977 | Downing | 34/60 |
| 4,289,614 | 9/1981 | Suzuki | 209/308 |
| 4,493,163 | 1/1985 | De Monbrison | 47/61 |
| 4,666,602 | 5/1987 | Hartzell | 210/298 |
| 5,021,077 | 6/1991 | Moore | 71/17 |
| 5,042,195 | 8/1991 | Lee et al. | 47/61 |
| 5,184,420 | 2/1993 | Papadopoulos et al. | 47/62 |
| 5,292,410 | 3/1994 | Sweeney | 426/539 |
| 5,865,131 | 2/1999 | Dietrich, Sr. et al. | 111/21 |

FOREIGN PATENT DOCUMENTS

| | | | |
|---|---|---|---|
| 1437513 | 3/1966 | France | 47/65 D |
| 3817289 | 11/1989 | Germany | 47/65 D |
| 356005197 | 1/1981 | Japan . | |
| 357180498 | 11/1982 | Japan . | |
| 404077382 | 3/1992 | Japan . | |
| 406166585 | 6/1994 | Japan . | |
| 410182273 | 7/1998 | Japan . | |
| 465305 | 12/1968 | Switzerland | 47/65 |
| 649371 | 2/1979 | U.S.S.R. | 47/65 |
| 1194303 | 11/1985 | U.S.S.R. . | |
| 2121263 | 12/1983 | United Kingdom | 47/65 D |
| 2206271 | 1/1989 | United Kingdom | 47/65 D |
| WO 90/15524 | 12/1990 | WIPO | 47/65 D |

*Primary Examiner*—Michael J. Carone
*Assistant Examiner*—Fredrick T. French, III
*Attorney, Agent, or Firm*—Litman, Kraai & Brown L.L.C.

[57] ABSTRACT

A system for germinating livestock feed grains and growing sprouts therefrom using a plant nutritive effluent from a manure treatment process includes a germination tray conveyor having an endless sequence of trays thereon, a grain deposit station at one end of the conveyor, a sprout offload station at an opposite end of the conveyor, and a plurality of effluent spray stations spaced between the grain deposit station and the offload station. Grain is deposited in a tray at the deposit station, solenoid spray valves are opened at timed intervals, and the trays are advanced to the next station in a timed sequence to allow the grains to germinate and the sprouts to mature by the time each tray reaches the offload station.

15 Claims, 5 Drawing Sheets

GERMINATION OF LIVESTOCK FEED GRAINS USING EFFLUENT FROM LIVESTOCK WASTE DIGESTION

BACKGROUND OF THE INVENTION

The economics of modern food production have caused a migration of much of livestock raising from dispersed, free range feeding of livestock to more concentrated operations, such as feedlots, dairy cow operations, and the like. Feedlots and other concentrated livestock raising methods decrease the time and labor required to feed the animals and reduce to some extent livestock body weight lost in moving stock around to grazing areas. It allows better control of the types of food ingested and makes the mechanization of food and water rationing more practical.

One of the problems with feedlots and concentrated livestock raising is the concentration of animal waste manure products that results. The problems involve not only aesthetic concerns, but also concerns about livestock and human health and effects on wildlife, plants, and soil. Good livestock raising practice and responsible environmental impact require that livestock wastes be treated and carefully managed rather than simply dumped raw into waterways and landfills.

Waste treatment methods range from simple lagoons in which bacterial action breaks waste products into less harmful components to digesters in which bacterial breakdown is aided by mechanical means. In general, waste treatment results in a mixture of solids suspended within a water based effluent. Settling occurs by gravity, based on the density of the solids, and the solids concentration ranges from near pure water near the top of a lagoon or digester tank to a heavy concentration at the bottom.

Another concern of feedlot operators is balancing the nutritional needs of livestock to maximize body weight with the cost of feeds. With typical feed rations, as much as 80 per cent of the feed ration consumed by dairy cows, for example, passes through undigested and provides no nutritional benefit to the cows. Feed rations for cattle include various combinations of feed grains, hay, silage, and feed supplements, such as minerals, and may vary with the breed, type, age, and weight of the cattle and additionally with geographical region, season, and feed availability.

SUMMARY OF THE INVENTION

The present invention provides for enhancing the cost effectiveness of livestock feeding and for recycling components from the treatment of waste products of the livestock. The present invention provides a process and apparatus for germinating feed grains using a plant nutritive aqueous effluent from livestock waste digestion or manure treatment. The apparatus includes a tray conveyor with a plurality of germination trays connected to a set of endless chains and supported on rollers by a conveyor frame. A feed grain supply hopper is positioned at a grain deposit station at one end of the conveyor, and a sprout offload station is positioned at an opposite end. Between the ends of the conveyor, a plurality of spray stations are positioned, each including a plurality of spray heads communicating with a pressurized source of a plant nutritive effluent from livestock waste digestion. A drive conveyor motor is controlled to move the trays in succession from the grain deposit station, beneath each spray station, to the sprout offload station in a timed sequence of steps.

The hopper is positioned on a hopper guide track transverse to the conveyor, includes a hopper gate motor engaged with a hopper gate, and includes a hopper translation motor engaged between the hopper and the guide track. The hopper gate is opened to deposit grain from the hopper onto a tray positioned beneath the hopper assembly as the hopper is translated across the conveyor by the hopper translation motor. The hopper motor may be controlled to translate the hopper from one side of the conveyor to the other and then returned to its starting position or, alternatively, may be controlled to translate the hopper in a single pass in opposite directions for successive trays positioned at the grain deposit station.

A germination controller system is connected to the hopper gate motor, the conveyor motor, and valves on the sprayheads. The controller causes the conveyor to move to each station in succession and to wait for a delay interval at each station. The length of the conveyor and the timing sequence is such as to allow germination and a considerable degree of growth of the feed grains from the grain deposit station to the sprout offload station.

The effluent provides both moisture and fertilizer for germination of the feed grain seeds and growth of the feed grain sprouts. The sprouts have higher nutritional value to the livestock than the ungerminated grains. Additionally, as low as 30 per cent of the sprouts when consumed pass through the livestock undigested. The present invention, thus, enhances the nutritive value of the feed grains to the livestock using recycled effluent from treatment of the waste manure of the livestock. The process can be run continuously and, due to the relative simplicity of the mechanism, is not compromised by power interruptions of relatively short duration. The use of the waste effluent is not toxic to the livestock and does not present an infectious hazard to the livestock.

OBJECTS AND ADVANTAGES OF THE INVENTION

The principal objects of the present invention are: to provide a more cost effective and energy efficient process for feeding livestock; to provide such a process which recycles a percentage of the waste products of the livestock; to provide, particularly, a process for germinating feed grains to sprouts of a selected maturity using a plant nutritive aqueous effluent from the treatment or digestion of livestock body wastes; to provide such a process which is mechanized, automatic, continuous, which requires minimal labor, and which is not sensitive to power interruptions of relatively short duration; to provide such a process in which an endless set of germination trays are conveyed to a grain deposit station, past a plurality of effluent spray stations, and to a sprout offload station in a repeating, timed sequence; to provide apparatus for such a process including a grain deposit hopper mounted on a set of hopper guide tracks and including a motorized grain gate and a hopper translation motor which, when activated, translates the hopper with opened grain gate across a tray to deposit a layer of grain on the tray; to provide such apparatus in which the conveyor includes a pair of endless chains extending between sets of drive sprockets and idler sprockets and upper and lower sets of tray guide rails; to provide such apparatus in which the trays are connected to the chains in end to end relation and have rollers which rode on the guide rails on upper and lower runs of the conveyor; to provide such apparatus including an effluent pump communicating between a source of the effluent and a pressurized tank which supplies effluent sprayheads at each of the spray stations with effluent through solenoid valves; to provide such apparatus including a germination controller which controls operation of the hopper, the spray heads, and the conveyor and includes a conveyor timer; to provide such apparatus in which the controller is implemented as conventional electromechanical timers and relays for simplicity and ruggedness of operation; to provide such a feed grain germination and sprout growth process which does not require soil and in which the mature sprouts are simply dumped into another container at the offload station; and to provide such a feed grain germination and growth process and apparatus which are economical to manufacture and operate and which are particularly well adapted for their intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 5:
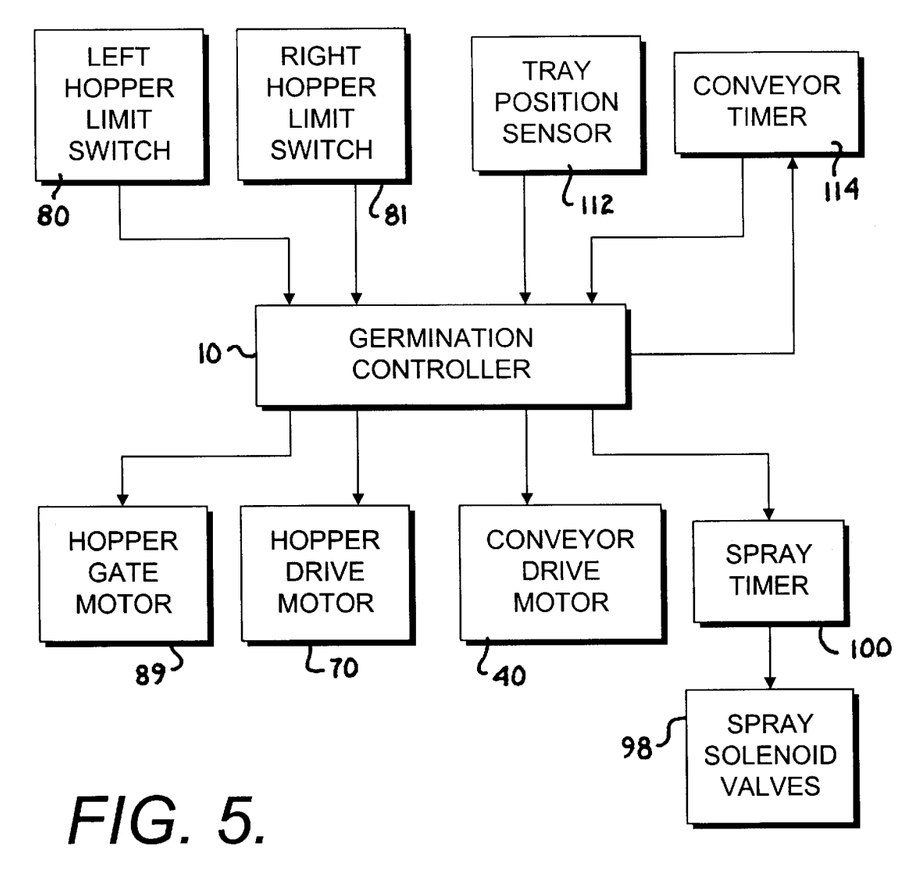
FIG. 5 is a block diagram illustrating a germination process controller and components controlled thereby.

Referring to the drawings in more detail:

The reference numeral 1 generally designates a feed grain germination system which embodies the present invention. The system 1 includes a tray conveyor 2 which conveys a plurality of grain germination trays 3 past a grain deposit station 4, past a plurality of effluent spray stations 5, to a sprout offload station 6, and back to the grain deposit station 4 in a timed sequence. At the grain deposit station 4, a layer of a feed grain 7 is deposited on the trays 3. At each spray station 5, a selected quantity of an effluent 8 from livestock waste digestion is sprayed onto the grain 7 or sprouts 9, as the case may be. The mature sprouts 9 are dumped by gravity out of the trays 3 into a container or onto a conveyor (neither shown) for use as feed for livestock. The system 1 operates under control of a germination controller 10 (FIG. 5).

Figures 1, 2:
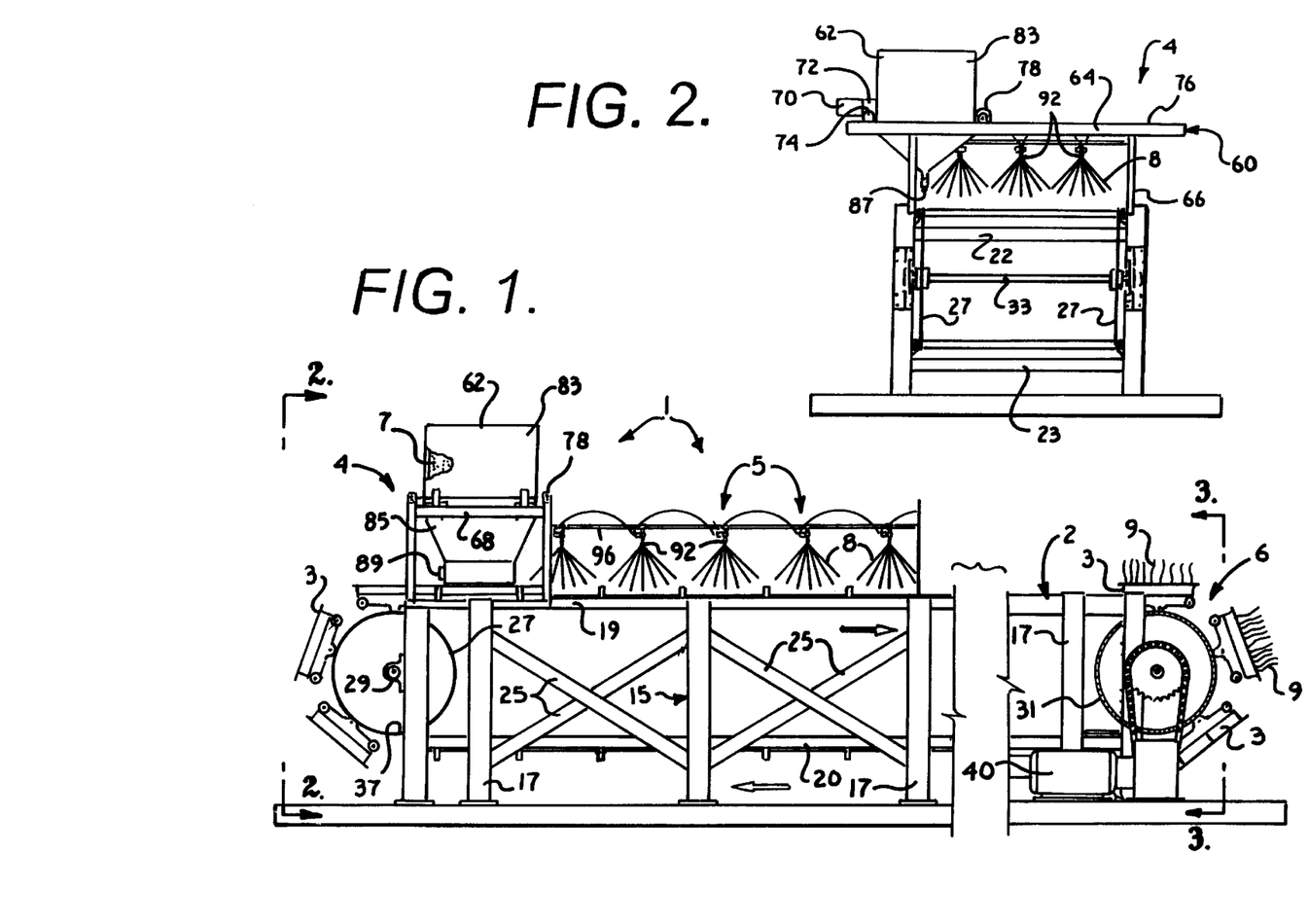
FIG. 1 is a fragmentary side elevational view of a feed grain germination apparatus embodying the present invention.
FIG. 2 is an end elevational view of the apparatus taken on line 2—2 of FIG. 1 and illustrates details of a mechanized feed grain deposit hopper, with trays removed for clarity.
Figure 3:
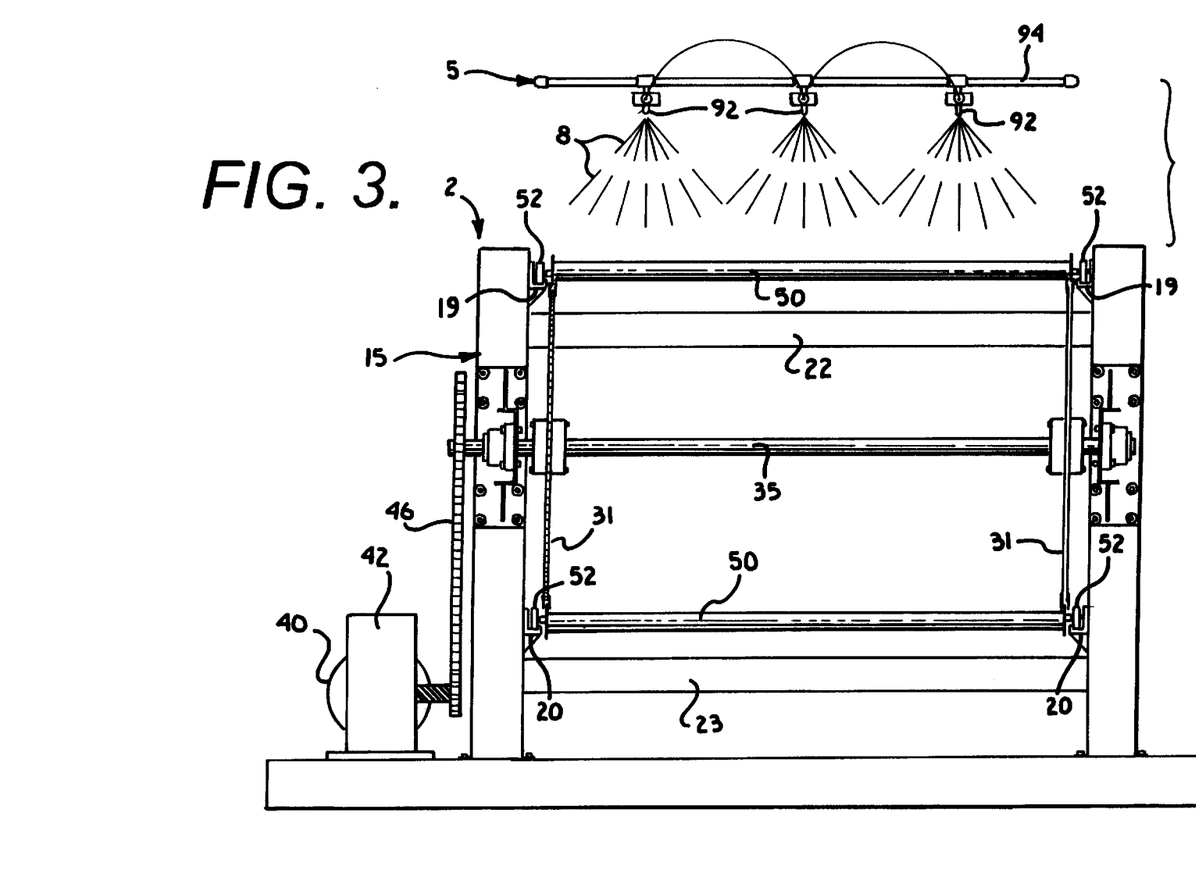
FIG. 3 is an enlarged transverse sectional view taken on line 3—3 of FIG. 1 and illustrates drive details of a germination conveyor of the apparatus of the present invention.

Referring to FIGS. 1 and 2, the tray conveyor 2 includes a conveyor frame 15 formed by a plurality of upstanding posts 17 connected by longitudinally extending upper and lower rails 19 and 20 and upper and lower cross members 22 and 23. The frame 15 may also include diagonal braces 25. A pair of idler sprockets 27 are journaled to the conveyor frame 15, as by pillow blocks 29 to posts 17, at the grain deposit station 4. Likewise, a pair of drive sprockets 31 are journaled to the frame 15 at the sprout offload station 6. The idler sprockets 27 are connected by an idler axle 33 (FIG. 2) while the drive sprockets 31 are connected by a drive axle 35 (FIG. 3). A pair of endless sprocket chains 37 are meshed respectively about the sets of sprockets 27 and 31.

Figure 4:
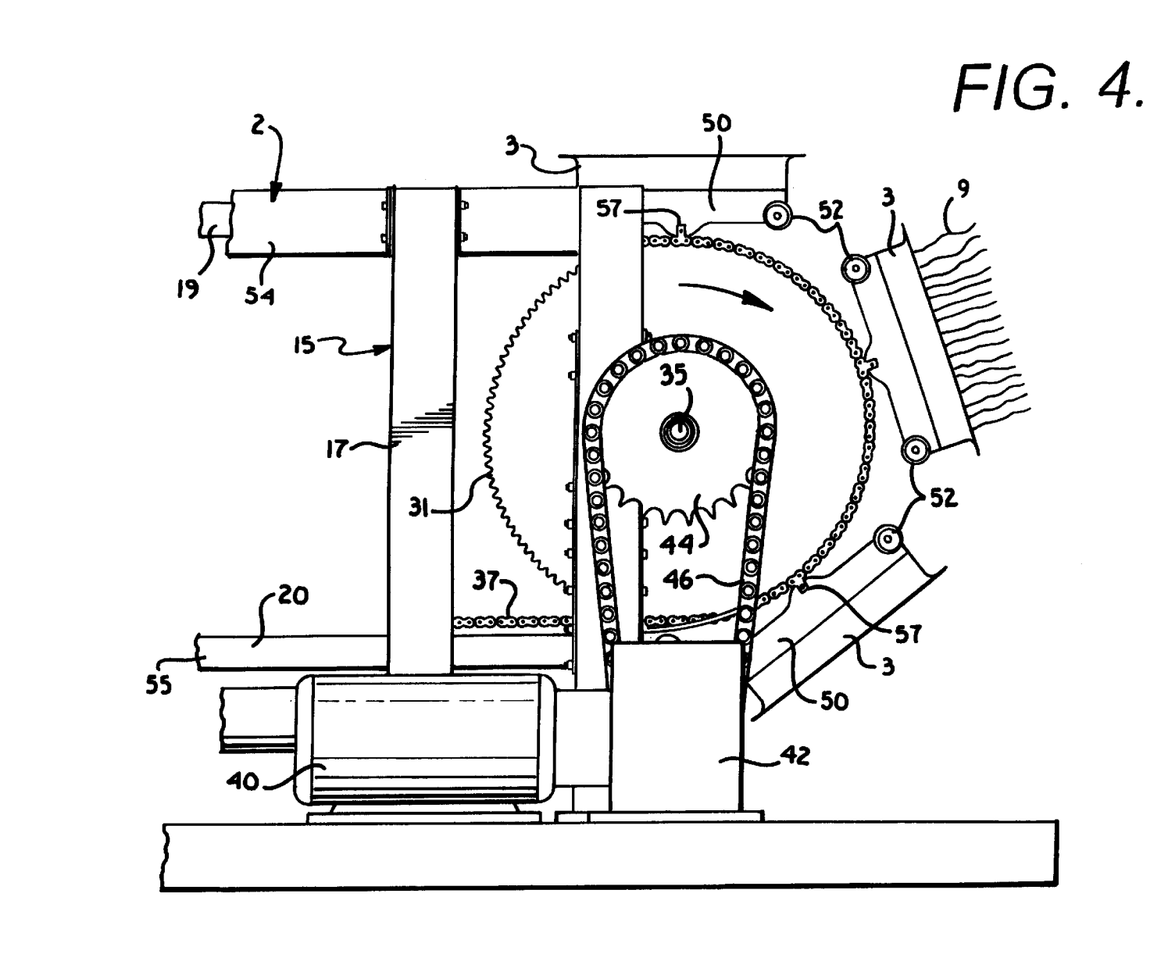
FIG. 4 is an enlarged fragmentary side elevational view of an offload station of the germination apparatus and illustrates further details of the conveyor drive motor and engagement thereof with tray conveyor chains.

Referring to FIGS. 3 and 4, rotation is transferred to the drive axle 35 from a conveyor drive motor 40 by way of a gear box 42, a set of drive reduction sprockets 44, and a drive chain 46. The gear box 42 incorporates bevel gears internally to change the axis of rotation of the motor 40 from a longitudinal direction of the conveyor frame 15 to a transverse direction relative to the frame 15. The conveyor drive motor 40 may be a relatively low horsepower motor, such as a quarter horsepower, since the combined reduction provided by the gear box 42 and drive reduction sprockets 44 is on the order of 1100 to 1. The tray conveyor 2 may be operated at low linear speeds.

The preferred dimensions for the germination trays 3 is 22 inches long by 120 inches wide (transverse to the conveyor frame 15) by 2.5 inches deep. Each tray 3 is connected to a rectangular tray frame 50 which has guide rollers 52 journaled at each corner. The upper and lower rails 19 and 20 are formed as inwardly turned L-shaped sections or angles which form upper and lower guide rails for the trays 3. The upper rails 19 form an outbound upper run 54 of the conveyor 2 while the lower rails 20 form a return lower run 55 of the conveyor 2. The rollers 52 of the tray frames 50 ride on the upper rails 19 during passage along the upper run 54 and on the lower rails 20 on the lower run 55 of the conveyor 2. Outer ends of the tray frames 50 are connected respectively to the conveyor chains 37 by clips 57. As the trays 3 move about the sprockets 27 and 31, they disengage from the rails 19 and 20. The structural members of the conveyor frame 15 are preferably coated with a material such as an epoxy paint to prevent and reduce corrosion, principally from the effluent 8. Members with wear surfaces, where painting is not practical, are preferably formed of a stainless steel.

Referring to FIGS. 1 and 2, the grain deposit station 4 includes a hopper support frame 60 which supports a feed grain hopper 62. The hopper frame 60 includes transversely extending hopper guide rails 64 supported above the tray conveyor 2 by legs 66. Longitudinally extending braces 68 complete the hopper support frame 60. The hopper 62 includes a hopper translation motor 70 attached thereto and engaged through a hopper gear box 72 with drive pinions 74. The drive pinions 74 mesh with hopper translation rack gears 76 extending along the hopper guide rails 64. Idler pinions 78 are journaled on the hopper 62 on the opposite side thereto from the drive pinions 74 and also mesh with the rack gears 76. The hopper frame 60 has left and right limit switches 80 and 81 (FIG. 5) which are engaged by the hopper 62 upon movement to the ends of the guide tracks 64. The hopper 62 includes an upper grain reservoir 83 and a lower grain funnel 85 which terminates in a hopper or grain gate 87. The grain gate 87 is controlled by a hopper or grain gate motor, indicated at 89 in FIG. 1. Operation of the hopper translation motor 70 and the hopper gate motor 89 is coordinated so that grain 7 is released through the hopper gate 87 as the hopper 62 is translated across the hopper frame 60.

Each spray station 5 includes a plurality of effluent sprayheads 92 (FIG. 3) supported in transversely spaced relation on transverse sprayhead support members 94. The transverse support members 94 may be supported by any convenient means, such as longitudinally extending sprayhead support members 96 (FIG. 1). The sprayheads 92 have orifices (not shown) which spray a roughly rectangular pattern such that the sprayheads 92 at a particular spray station 5 provide adequate coverage of the grain 7 or sprouts 9 within the tray 3 positioned therebelow.

Figure 6:
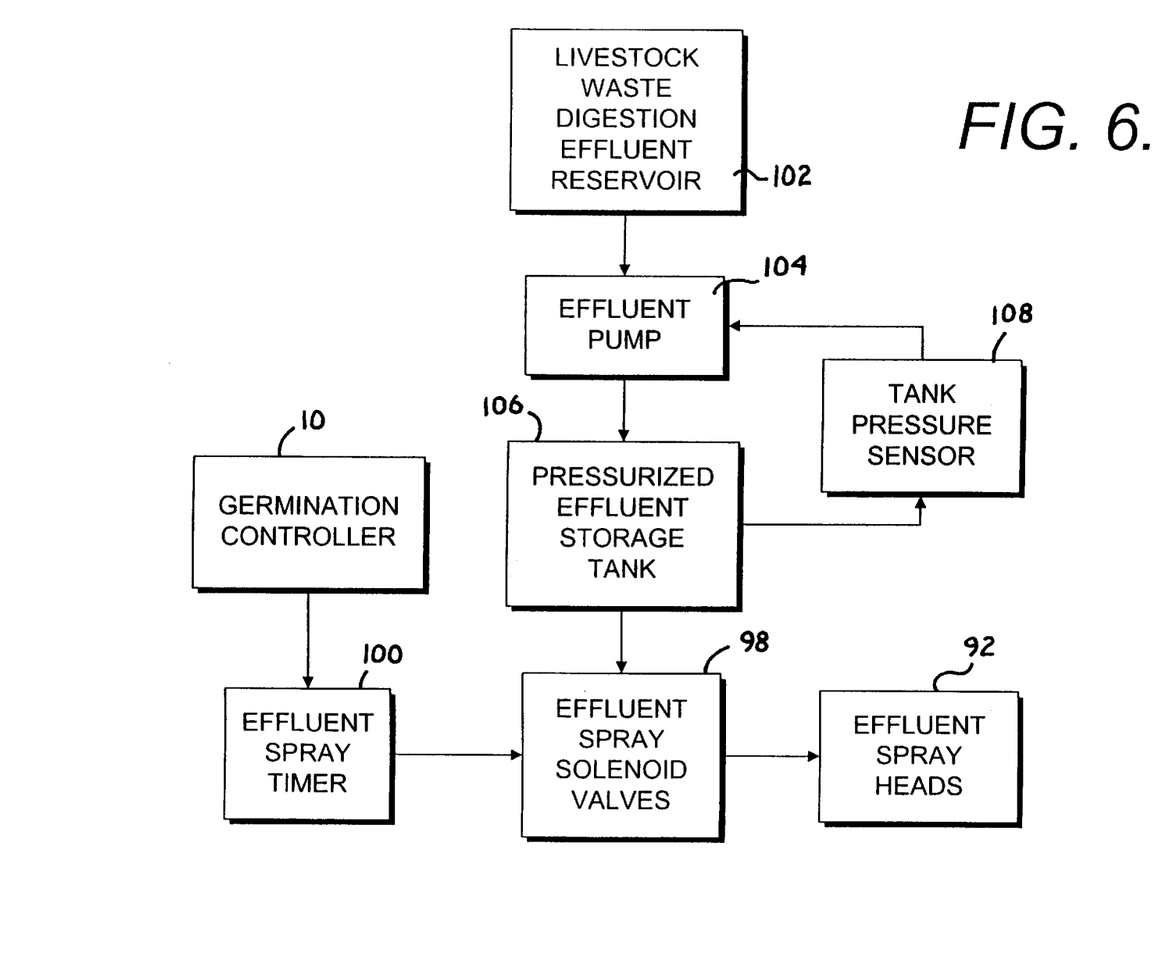
FIG. 6 is a block diagram illustrating components of an effluent spray subsystem of the feed grain germination apparatus.

Referring to FIG. 6, flow to the sprayheads 92 is controlled by effluent spray solenoid valves 98 which, in turn, are activated by an effluent spray timer 100 which is controlled by the germination controller 10. The effluent 8 is pumped from an effluent reservoir 102 by an effluent pump 104 to pressurize an effluent storage tank 106. The pump 104 is controlled by a tank pressure sensor 108 which activates the pump 104 when pressure within the tank 106 falls below a selected level. The effluent reservoir 102 may be a livestock waste or manure treatment lagoon or a waste digester. Preferably, the effluent 8 is drawn from a such a level of the reservoir 102 that the concentration of solids within the aqueous effluent is about 5 per cent. A strainer or separator (not shown) may be employed between the reservoir 102 and the pump 104, particularly if the reservoir 102 is a treatment lagoon, to avoid clogging the sprayheads 92.

Referring to FIG. 5, operation of the system 1 is controlled by the germination controller 10. The controller 10 may be a programmed computer, a programmable logic controller, or the like. Preferably, for simplicity and reliability, the controller 10 includes electromechanical relays (not shown). The left and right hopper limit switches 80 and 81 form inputs to the controller 10 along with a tray position sensor 112 and a conveyor timer 114. The hopper gate motor 89, hopper translation or drive motor 70, the conveyor drive motor 40, and the spray timer 100 form outputs from the controller 10. The tray position sensor 112 senses when a tray 3 is properly positioned at the grain deposit station 4 to receive grain 7 and may take the form of a momentary contact switch, a photocell set, or the like.

Proper registration of a tray 3 at the grain deposit station 4 causes the controller 10 to deactivate the conveyor drive motor 40, start the cycle of the conveyor timer 114, and activate the hopper drive motor 70. The hopper 62 makes a pass over the tray 3 at the grain deposit station 4, depositing the feed grain 7 thereon. As the hopper 62 disengages one of the limit switches 80 or 81, the hopper gate motor 89 is activated to open the hopper gate 87. When the hopper 62 engages the opposite limit switch, the hopper gate motor 89 and the hopper drive motor 70 are deactivated. In coordination with the operation of the hopper 62 at the grain deposit station 4, the spray timer 100 is activated to open all the spray solenoid valves 98 for a selected length of time to allow a metered amount of the effluent 9 to be sprayed on each of the trays 3 at the spray stations 5. When the spray timer 100 times out, the solenoid valves 92 are closed. The spray timer 100 may be reactivated numerous times while a given tray 3 is located at a given spray station 5. When the conveyor timer 114 times out, the conveyor drive motor 40 is activated to advance each tray 3 on the conveyor 2 to the next station. Activation of the conveyor drive motor 40 is interrupted when the tray position sensor 112 detects an empty tray 3 at the grain deposit station 4, and the cycle repeats.

The length of the conveyor 2, the timing of events in the system 1, the amount and type of grain 7 used, and the amount of effluent 8 applied the grain 7 and sprouts 9 depends on the type of livestock which is to receive the sprouts 9. The system 1 is particularly suited for enhancing the feedstocks of livestock raised for meat and dairy purposes, such as cattle, hogs, and sheep. However, it is also applicable to other types of livestock which are raised in concentrated facilities, such as turkeys and chickens. Other factors, such as ambient temperature and relative humidity can affect the drying rate of the effluent, such that means for adjusting the amount and timing spraying the effluent 8 on the grain 7 and sprouts 9 is foreseen.

In an example for certain types of dairy cows, the system 1 includes 55 spray stations 5 at approximately 24 inch spacing, the trays 3 receive about 150 pounds of grain, the conveyor delay time is about 4 hours, and approximately one quart of effluent 8 is sprayed on each tray 3 at intervals of about 1.5 hours. The length of time for a given tray 3 to pass from the grain deposit station 4 to the sprout offload station 6 is on the order of 10 days. A system 1 operated under these parameters can continuously provide the bulk of the feed required by a herd of about 100 dairy cows. Additional feed components and supplements are also required to maintain the health and milk production of the cows.

It is to be understood that while certain forms of the present invention have been illustrated and described herein, it is not to be limited to the specific forms or arrangement of parts described and shown.

What is claimed and desired to be secured by Letters Patent is as follows:

1. A process for germinating a feed grain to a plurality of sprouts for use as a livestock feed and comprising the steps of:

(a) mechanically depositing a layer of said feed grain onto a grain tray at a grain deposit station by the steps of:
        (1) depositing a quantity of said feed grain into a grain hopper including a grain deposit gate and a gate motor engaged with said gate and operable to open and close said gate;
        (2) positioning said hopper at one end of a hopper guide track extending across said grain deposit station;
        (3) mechanically conveying said hopper along said track between said opposite ends;
        (4) opening said grain deposit gate at one end of said track by operation of said gate motor to deposit said layer of said feed grain onto a tray positioned at said grain deposit station; and
        (5) closing said grain deposit gate at an opposite end of said track using said gate motor;
    (b) mechanically conveying said tray to a spray station of a plurality of spray stations, each spray station including an effluent sprayhead communicating with a source of a plant nutritive effluent from a manure treatment process;
    (c) spraying a selected quantity of said effluent onto said feed grain at said spray station;
    (d) retaining said tray at said spray station for a selected interval of time;
    (e) at an end of said selected interval, conveying said tray to a subsequent spray station;
    (f) repeating steps (c), (d), and (e) for a selected number of cycles to germinate said feed grain into a plurality of sprouts having a selected degree of maturity;
    (g) offloading said sprouts at an offload station; and
    (h) mechanically conveying said tray back to said grain deposit station.

2. An apparatus for germinating a feed grain to a plurality of sprouts for use as a livestock feed and comprising:
  (a) an elongated germination tray conveyor including a grain deposit station at one end of said conveyor and an offload station at an opposite end of said conveyor from said grain deposit station;
  (b) a conveyor drive motor engaged with said conveyor and activated to operate said conveyor;
  (c) a grain germination tray connected to said conveyor in such a manner that said tray is conveyed along said conveyor upon activation of said conveyor drive motor;
  (d) a feed grain supply positioned at said grain deposit station, said grain supply including a supply motor engaged with said grain supply in such a manner as to cause said grain supply to deposit a layer of said feed grain onto said tray positioned at said grain deposit station upon activation of said supply motor;
  (e) a plurality of spray stations spaced along said conveyor between said grain deposit station and said offload station, each spray station including a sprayhead communicating through an associated spray valve with a source of a plant nutritive effluent from a manure treatment process; and
  (f) a germination controller coupled to said conveyor drive motor, said grain supply motor, and each spray valve; said controller being operative to cause said hopper to deposit a layer of grain onto said tray, to cause said conveyor to convey said tray to each spray station in a succession of timed steps and to said offload station at which germinated sprouts are offloaded from said tray; and to cause said spray heads to spray a selected quantity of said effluent onto said tray at the associated spray stations.

3. An apparatus as set forth in claim 1 wherein said grain supply includes:
  (a) an elongated hopper guide track having opposite track ends and extending over said conveyor at said grain deposit station;
  (b) a feed grain supply hopper positioned on said guide track at said grain deposit station, said hopper including a hopper gate and a hopper gate motor engaged with said hopper gate in such a manner that said gate is selectively opened to deposit a layer of said feed grain onto said tray at said grain deposit station;
  (c) a hopper translation motor engaged between said track and said hopper and operable to translate said hopper between said opposite track ends; and
  (d) said controller being coupled to said translation motor, causing said hopper to be translated between said opposite track ends, and causing said hopper gate to be opened during said translation to thereby cause said hopper to deposit said layer of grain onto said tray.

4. An apparatus as set forth in claim 1 wherein said conveyor includes:
  (a) an outbound upper run extending from said grain deposit station to said offload station;
  (b) an return lower run extending from said offload station to said grain deposit station;
  (c) a plurality of grain germination trays connected to said conveyor in substantially end to end relation along said upper run and said lower run of said conveyor; and
  (d) said controller being operative to cause said conveyor to continually convey said trays to said grain deposit station, each spray station, said offload station, and back to said grain deposit station in a timed sequence.

5. An apparatus as set forth in claim 1 wherein said conveyor includes:
  (a) an elongated conveyor frame having opposite ends;
  (b) a drive sprocket journaled to said conveyor frame at one of said conveyor frame opposite ends;
  (c) an idler sprocket journaled to said conveyor frame at an end of said frame opposite said drive sprocket;
  (d) an endless chain extending about and meshed with said drive sprocket and said idler sprocket to form said upper conveyor run and said lower conveyor run such that said idler sprocket rotates and said chain moves linearly along said conveyor frame upon said drive sprocket being rotated;
  (e) a plurality of grain germination trays connected to said chain in substantially end to end relation along said upper run and said lower run of said conveyor; and
  (f) said conveyor drive motor drivingly engaging said drive sprocket such that said drive sprocket rotates upon activation of said conveyor drive motor.

6. An apparatus as set forth in claim 5 wherein said conveyor includes:
  (a) an elongated upper tray guide rail extending along said conveyor frame;
  (b) an elongated lower tray guide rail extending along said conveyor frame;
  (c) said trays engaging said upper tray guide rail upon being conveyed along said upper run of said conveyor; and
  (d) said trays engaging said lower tray guide rail upon being conveyed along said lower run of said conveyor.

7. An apparatus as set forth in claim 2 wherein said conveyor includes:
  (a) an elongated conveyor frame having opposite ends;
  (b) a pair of transversely spaced drive sprockets connected by a drive axle and journaled to said conveyor frame at one of said opposite ends of said conveyor;
  (c) a pair of transversely spaced idler sprockets connected by an idler axle and journaled to said conveyor frame at an end of said conveyor opposite said drive sprockets;
  (d) a pair of endless chains extending about and meshed respectively with said pairs of drive sprockets and idler sprockets to form respectively said upper conveyor run and said lower conveyor run such that said idler sprockets rotate and chains move linearly along said conveyor frame upon said drive sprockets being rotated;
  (e) a plurality of grain germination trays connected to said chains in substantially end to end relation along said upper run and said lower run of said conveyor; and
  (f) said conveyor drive motor drivingly engaging said drive sprockets to thereby rotate said drive sprockets activation of said conveyor drive motor.

8. An apparatus as set forth in claim 1 wherein said conveyor includes:
  (a) a pair of elongated upper tray guide rails extending along said conveyor frame in transversely spaced relation;
  (b) a pair of elongated lower tray guide rails extending along said conveyor frame in transversely spaced relation;

(c) each of said trays having two pairs of tray guide rollers journaled thereon in respective end to end and transversely spaced relation;

(d) said tray guide rollers engaging said upper guide rails upon being conveyed along said upper conveyor run; and (e) said tray guide rollers engaging said lower guide rails upon being conveyed along said lower conveyor run.

9. An apparatus for germinating a feed grain to a plurality of sprouts for use as a livestock feed and comprising:

(a) an elongated germination tray conveyor having an outbound upper run, a return lower run, a grain deposit station at one end of said conveyor, and an offload station at an opposite end of said conveyor from said grain deposit station;

(b) a conveyor drive motor engaged with said conveyor and activated to operate said conveyor;

(c) a plurality of grain germination trays connected to said conveyor in such a manner that said trays are conveyed along said upper and lower runs upon operation of said conveyor;

(d) a feed grain supply hopper positioned at said grain deposit station, said hopper including a hopper gate and a hopper gate motor engaged with said hopper gate in such a manner that said gate is selectively opened to deposit a layer of said feed grain onto a tray positioned at said grain deposit station;

(e) a plurality of spray stations spaced along said conveyor between said grain deposit station and said offload station, each spray station including a sprayhead communicating through an associated spray valve with a source of a plant nutritive effluent from a manure treatment process; and (f) a germination controller coupled to said conveyor drive motor, said hopper gate motor, and each spray valve; said controller being operative to cause said hopper to deposit a layer of grain onto each of a succession of said trays; to cause said conveyor to convey said trays to each spray station in a succession of timed steps, past said offload station at which germinated sprouts are offloaded from said trays, and back to said grain deposit station; and to cause said spray heads to spray a selected quantity of said effluent onto a tray located at the associated spray station.

10. An apparatus as set forth in claim 1 wherein said hopper includes:

(a) an elongated hopper guide track having opposite track ends and extending over said conveyor at said grain deposit station;

(b) a hopper translation motor engaged between said track and said hopper and operable to translate said hopper between said opposite track ends; and (c) said controller being coupled to said translation motor and causing said hopper to be translated between said opposite track ends upon one of said trays being conveyed to said grain deposit station and causing said hopper gate to be opened during said translation to thereby cause said hopper to deposit said layer of grain onto said tray.

11. An apparatus as set forth in claim 1 wherein said conveyor includes:

(a) an outbound upper run extending from said grain deposit station to said offload station;

(b) an return lower run extending from said offload station to said grain deposit station;

(c) a plurality of grain germination trays connected to said conveyor in substantially end to end relation along said upper run and said lower run of said conveyor; and (d) said controller being operative to cause said conveyor to continually convey said trays to said grain deposit station, each spray station, said offload station, and back to said grain deposit station in a timed sequence.

12. An apparatus as set forth in claim 1 wherein said conveyor includes:

(a) an elongated conveyor frame having opposite ends;

(b) a drive sprocket journaled to said conveyor frame at one of said conveyor frame opposite ends;

(c) an idler sprocket journaled to said conveyor frame at an end of said frame opposite said drive sprocket;

(d) an endless chain extending about and meshed with said drive sprocket and said idler sprocket to form said upper conveyor run and said lower conveyor run such that said idler sprocket rotates and said chain moves linearly along said conveyor frame upon said drive sprocket being rotated;

(e) a plurality of grain germination trays connected to said chain in substantially end to end relation along said upper run and said lower run of said conveyor; and (f) said conveyor drive motor drivingly engaging said drive sprocket such that said drive sprocket rotates upon activation of said conveyor drive motor.

13. An apparatus as set forth in claim 1 wherein said conveyor includes:

(a) an elongated upper tray guide rail extending along said conveyor frame;

(b) an elongated lower tray guide rail extending along said conveyor frame;

(c) said trays engaging said upper tray guide rail upon being conveyed along said upper run of said conveyor; and (d) said trays engaging said lower tray guide rail upon being conveyed along said lower run of said conveyor.

14. An apparatus as set forth in claim 1 wherein said conveyor includes:

(a) an elongated conveyor frame having opposite ends;

(b) a pair of transversely spaced drive sprockets connected by a drive axle and journaled to said conveyor frame at one of said opposite ends of said conveyor;

(c) a pair of transversely spaced idler sprockets connected by an idler axle and journaled to said conveyor frame at an end of said conveyor opposite said drive sprockets;

(d) a pair of endless chains extending about and meshed respectively with said pairs of drive sprockets and idler sprockets to form respectively said upper conveyor run and said lower conveyor run such that said idler sprockets rotate and chains move linearly along said conveyor frame upon said drive sprockets being rotated;

(e) a plurality of grain germination trays connected to said chains in substantially end to end relation along said upper run and said lower run of said conveyor; and (f) said conveyor drive motor drivingly engaging said drive sprockets to thereby rotate said drive sprockets activation of said conveyor drive motor.

15. An apparatus as set forth in claim 1 wherein said conveyor includes:
 (a) a pair of elongated upper tray guide rails extending along said conveyor frame in transversely spaced relation;
 (b) a pair of elongated lower tray guide rails extending along said conveyor frame in transversely spaced relation;
 (c) each of said trays having two pairs of tray guide rollers journaled thereon in respective end to end and transversely spaced relation;
 (d) said tray guide rollers engaging said upper guide rails upon being conveyed along said upper conveyor run; and
 (e) said tray guide rollers engaging said lower guide rails upon being conveyed along said lower conveyor run.

* * * * *

UNITED STATES PATENT AND TRADEMARK OFFICE
CERTIFICATE OF CORRECTION

PATENT NO. : 6,055,771
DATED : May 2, 2000
INVENTOR(S) : Dorothy O'Haver Warnacut It is certified that error appears in the above-identified patent and that said Letters Patent is hereby corrected as shown below:

<u>Title page,</u>
Item [73] Assignee: delete "Dorian Industries, Inc., Wichita, Kans."

Signed and Sealed this

Eleventh Day of December, 2001

Attest:

*Nicholas P. Godici*

NICHOLAS P. GODICI
*Attesting Officer*     *Acting Director of the United States Patent and Trademark Office*